US009438353B2

(12) United States Patent
Yun et al.

(10) Patent No.: US 9,438,353 B2
(45) Date of Patent: Sep. 6, 2016

(54) OPTICAL RECEIVER FOR COMPENSATING DC OFFSET

(71) Applicants: INDUSTRY-UNIVERSITY COOPERATION FOUNDATION HANYANG UNIVERSITY, Seoul (KR); OE Solutions Co., Ltd., Gwangju (KR)

(72) Inventors: Tae-Yeoul Yun, Seoul (KR); Moon Soo Park, Anyang (KR); Ji-Young Lee, Seoul (KR); Ji-Young Lee, Seoul (KR); Jun-Young Park, Seoul (KR)

(73) Assignees: Industry-University Cooperation Foundation Hanyang University, Seoul (KR); OE Solutions Co., Ltd., Gwangju (KR)

( * ) Notice: Subject to any disclaimer, the term of this patent is extended or adjusted under 35 U.S.C. 154(b) by 70 days.

(21) Appl. No.: 14/585,005

(22) Filed: Dec. 29, 2014

(65) Prior Publication Data

US 2015/0195046 A1    Jul. 9, 2015

(30) Foreign Application Priority Data

Dec. 31, 2013  (KR) .................. 10-2013-0168777

(51) Int. Cl.
*H04B 10/00*     (2013.01)
*H04B 10/69*     (2013.01)

(52) U.S. Cl.
CPC .................................... *H04B 10/69* (2013.01)

(58) Field of Classification Search
USPC .................................................. 398/202–214
See application file for complete search history.

(56) References Cited

U.S. PATENT DOCUMENTS

| 4,545,076 | A | * | 10/1985 | Biard | H01L 27/0802 257/E27.047 |
| 4,718,119 | A | * | 1/1988 | Salzer | H04B 10/6931 330/278 |
| 5,430,765 | A | * | 7/1995 | Nagahori | H04B 10/6933 330/259 |
| 5,508,836 | A | * | 4/1996 | DeCaro | H04B 10/11 398/1 |
| 5,532,471 | A | * | 7/1996 | Khorramabadi | H04B 10/6931 250/214 A |
| 5,737,111 | A | * | 4/1998 | Mori | H04B 10/6933 250/214 A |
| 5,917,639 | A | * | 6/1999 | Ushirozawa | H04B 10/6931 250/201.1 |
| 6,191,879 | B1 | * | 2/2001 | Yanagisawa | H04B 10/6933 250/214 A |
| 6,307,660 | B1 | * | 10/2001 | Cordell | H04B 10/6911 398/209 |
| 6,333,804 | B1 | * | 12/2001 | Nishiyama | H04B 10/69 250/214 A |
| 6,342,694 | B1 | * | 1/2002 | Satoh | H04B 10/6911 250/214 A |
| 6,414,776 | B1 | * | 7/2002 | Omata | H04B 10/695 398/202 |
| 6,437,308 | B1 | * | 8/2002 | Koh | G01J 1/44 250/214 A |
| 6,476,954 | B1 | * | 11/2002 | Nishizono | H04B 10/697 327/514 |

(Continued)

FOREIGN PATENT DOCUMENTS

JP    2005-110041 A    4/2005
KR    10-2009-0020160 A    2/2009

*Primary Examiner* — Agustin Bello

(57) ABSTRACT

Disclosed is an optical communication receiver capable of compensating a DC offset while preventing an input load effect. The optical communication receiver includes an optical signal detector; an amplifier inputted with a photocurrent outputted from the optical signal detector; and a DC offset compensation unit provided therein with a third transistor and a fifth transistor which are connected in series to each other to prevent an input load effect, wherein the DC offset compensation unit compensates a DC offset by outputting at least a portion of DC current inputted to the amplifier to ground through the third transistor and the fifth transistor when the photocurrent is an over current more than a predetermined set value.

12 Claims, 6 Drawing Sheets

(56) References Cited

U.S. PATENT DOCUMENTS

| | | | | |
|---|---|---|---|---|
| 6,525,305 | B2* | 2/2003 | Deschamps | H01J 40/14 250/214 C |
| 6,684,032 | B1* | 1/2004 | Umeda | H04B 10/695 257/80 |
| 6,785,477 | B1* | 8/2004 | Masuda | H03F 3/08 398/202 |
| 6,803,825 | B2* | 10/2004 | Chiou | H03F 3/087 250/214 A |
| 6,909,081 | B2* | 6/2005 | Bloehbaum | H03F 3/08 250/214 A |
| 7,030,702 | B2* | 4/2006 | Denoyer | H03F 3/08 250/214 A |
| 7,057,423 | B2* | 6/2006 | Ha | H03F 3/08 250/214 A |
| 7,060,956 | B2* | 6/2006 | Pantigny | H04N 5/374 250/208.1 |
| 7,157,684 | B2* | 1/2007 | Itoh | H03F 3/08 250/214 A |
| 7,454,190 | B2* | 11/2008 | Schrodinger | H04B 10/693 330/98 |
| 7,502,569 | B2* | 3/2009 | Kimura | H03F 1/08 398/202 |
| 7,509,058 | B2* | 3/2009 | Ono | H04B 10/69 398/208 |
| 7,570,109 | B2* | 8/2009 | Xu | H03D 1/18 329/347 |
| 7,868,294 | B2* | 1/2011 | Holcombe | H04B 10/1141 250/338.1 |
| 7,912,380 | B2* | 3/2011 | Uesaka | H04B 10/0799 398/202 |
| 8,190,035 | B2* | 5/2012 | Blauvelt | H04B 10/693 250/214 A |
| 8,260,155 | B2* | 9/2012 | Inoue | G08C 23/04 398/209 |
| 8,306,437 | B2* | 11/2012 | Tsunoda | H01L 31/02027 398/164 |
| 8,463,143 | B2* | 6/2013 | Sugimoto | H04B 10/6933 250/200 |
| 8,841,972 | B2* | 9/2014 | Schuppener | H03F 3/08 330/308 |
| 8,891,978 | B2* | 11/2014 | Kawahito | H01L 27/14603 398/207 |
| 8,948,613 | B2* | 2/2015 | Schmitt | H03G 3/3084 356/450 |
| 8,977,138 | B2* | 3/2015 | Proesel | G01J 1/46 398/208 |
| 2011/0293292 | A1* | 12/2011 | Tsai | H04B 10/697 398/202 |
| 2011/0318015 | A1* | 12/2011 | Sugimoto | H04B 10/6933 398/116 |
| 2015/0195046 | A1* | 7/2015 | Yun | H04B 10/69 398/208 |

* cited by examiner

OPTICAL RECEIVER FOR COMPENSATING DC OFFSET

CROSS-REFERENCE TO RELATED APPLICATIONS

This application claims priority of Korean Patent Application No. 10-2013-0168777, filed on Dec. 31, 2013, in the Korean Intellectual Property Office, which is hereby incorporated by reference in its entirety.

BACKGROUND OF THE INVENTION

1. Field of the Invention

The present disclosure relates to an optical communication receiver.

2. Description of the Related Art

An optical communication receiver receives an optical signal from an optical communication transmitter to convert it into a photocurrent and outputs the photocurrent as converted.

A conventional optical communication receiver does present an appropriate structure capable of preventing an input load effect, while preventing a DC offset at a time when an overload occurs.

[Prior Art Document] Korean Patent Application Publication No. 2010-0021938 (Publication Date: Feb. 26, 2010).

SUMMARY OF THE INVENTION

The present invention provides an optical communication receiver capable of compensating a DC offset while preventing an input load effect.

In addition, the present invention provides an optical communication receiver including a negative feedback prevention circuit capable of preventing a negative feedback of an AC photo current outputted from a photodiode.

In order to achieve the objects described above, according to one aspect of the present invention, an optical communication receiver includes an optical signal detector; an amplifier inputted with a photocurrent outputted from the optical signal detector; and a DC offset compensation unit provided therein with a third transistor and a fifth transistor which are connected in series to each other so as to prevent an input load effect, wherein the DC offset compensation unit compensates a DC offset by outputting at least a portion of DC current inputted to the amplifier to ground through the third transistor and the fifth transistor when the photocurrent is an over current more than a predetermined set value.

According to another aspect of the present invention, an optical communication receiver includes an optical signal detector; an amplifier inputted with a photocurrent outputted from the optical signal detector; and a DC offset compensation unit compensating a DC offset by discharging at least a portion of a DC current inputted into the amplifier when the photocurrent is an over current more than a predetermined set value. Wherein a negative feedback prevention circuit is provided in a negative feedback current path through the optical signal detector and the DC offset compensation unit, and the negative feedback prevention circuit serves to feed an alternating current of the photocurrent outputted from the optical signal detector back to the negative feedback current path.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
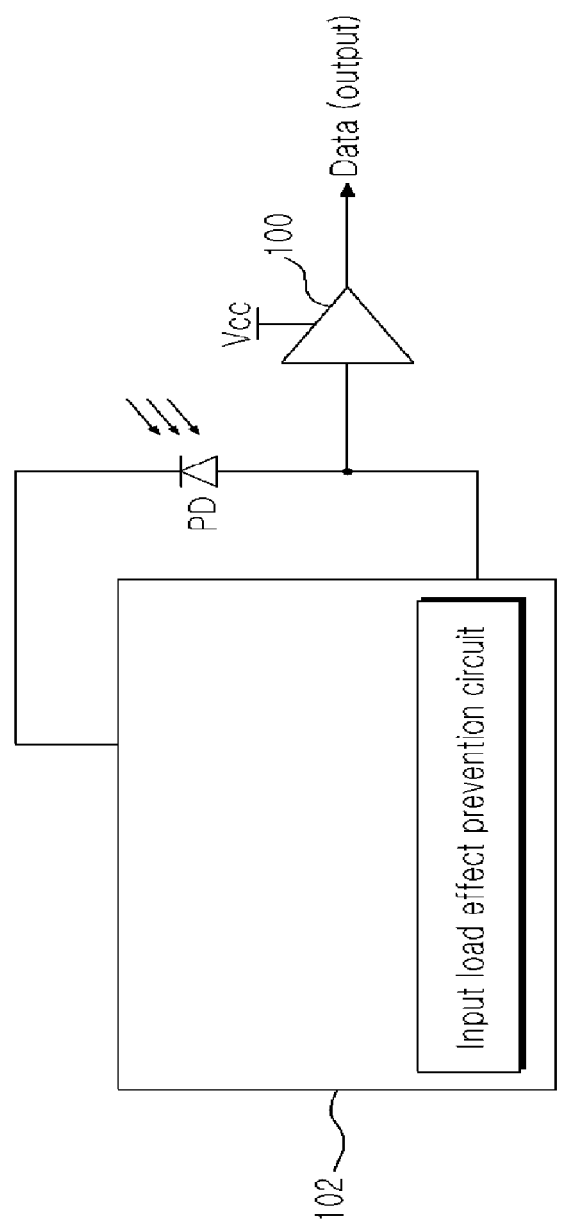
FIG. 1 is a diagram showing a circuit of an optical communication receiver according to one aspect of the present invention.

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

Hereinafter, embodiments of the present invention will now be described in detail with reference to the accompanying drawings.

The present invention relates to a direct current (DC) circuit for compensating an offset in optical communication receivers, and it is possible to reduce an input load effect of a trans-impedance amplifier input (TIA).

In addition, the optical communication receiver of the present invention can prevent a loss of low-frequency signal caused by a negative feedback of an AC signal (alternating current of photocurrent) that may occur in the course of compensating the DC offset. For example, the optical communication receiver prevents a negative feedback of the AC signal by forming, for example, a capacitor in the negative feedback current path. In particular, the optical communication receiver is provided therein with a circuit capable of preventing the negative feedback of the AC signal using a small capacitor.

Hereinafter, the optical communication receivers according to various embodiments of the present invention will be described with reference to the accompanying drawings.

FIG. 1 is a diagram showing a circuit of the optical communication receiver according to an aspect of the present invention.

Referring to FIG. 1, the optical communication receiver according to the aspect includes an optical signal detector, for example, such as a photodiode (PD), an amplifier 100, for example, such as a trans-impedance amplifier, and a DC offset compensation circuit 102.

The photodiode (PD) receives an optical signal transmitted from an optical transmitter, and converts the received optical signal into an electrical signal (photo current) to be output.

The amplifier 100 amplifies and outputs a weak photocurrent supplied from the photodiode (PD) while having a sufficient gain.

The DC offset compensation circuit 102 may compensate for an over current so that the amplifier 100 does not become saturated due to the over-current when the photocurrent outputted from the photodiode (PD) is the over current more than the predetermined set value. Specifically, the DC level at the input terminal of the amplifier 100 increases when the over current is input to the amplifier 100, and at this time the present invention can reduce the amount of current inputted to the amplifier 100 by discharging at least a portion of current inputted to the amplifier 100 using the DC offset compensation circuit 102.

However, in light of an optical communication receiver, the photocurrent inputted to the amplifier 100 may be disturbed due to the DC offset compensation circuit 102 compensating the DC offset amplifier, and as a result, a loss of the photoelectric current inputted to the amplifier 100 may occur. Such a phenomenon is called as an input load effect. Therefore, the optical communication receiver of the present invention may include an input load effect preventing circuit to remove the input load effect.

According to one aspect of the invention, the input load effect preventing portion may be implemented in the DC offset compensation circuit 102, and it is possible to prevent the input load effect through a method of designing, for example, great impedance.

That is, the optical communication receiver according to the present invention can compensate the DC offset while preventing the input load effect.

On the other hand, a negative feedback current path may be formed through the photodiode (PD) and the DC offset compensation circuit 104. As a result, an alternating current out of the photocurrent inputted to the amplifier 100 may be negative-feedback through the negative feedback current path, and then may be inputted to the amplifier 100. Therefore, the optical communication receiver of the present invention may further include a circuit for removing the alternating current that negative-feeds back in such a manner.

According to one aspect of the present invention, the circuit for removing the alternating current that negative-feeds back may be implemented in the DC offset compensation circuit 102.

In summary, the DC offset compensation circuit 102 may include a circuit for compensating the DC offset, a circuit for preventing the input load effect and a circuit for eliminating an alternating current that negative-feeds back.

Figure 2:
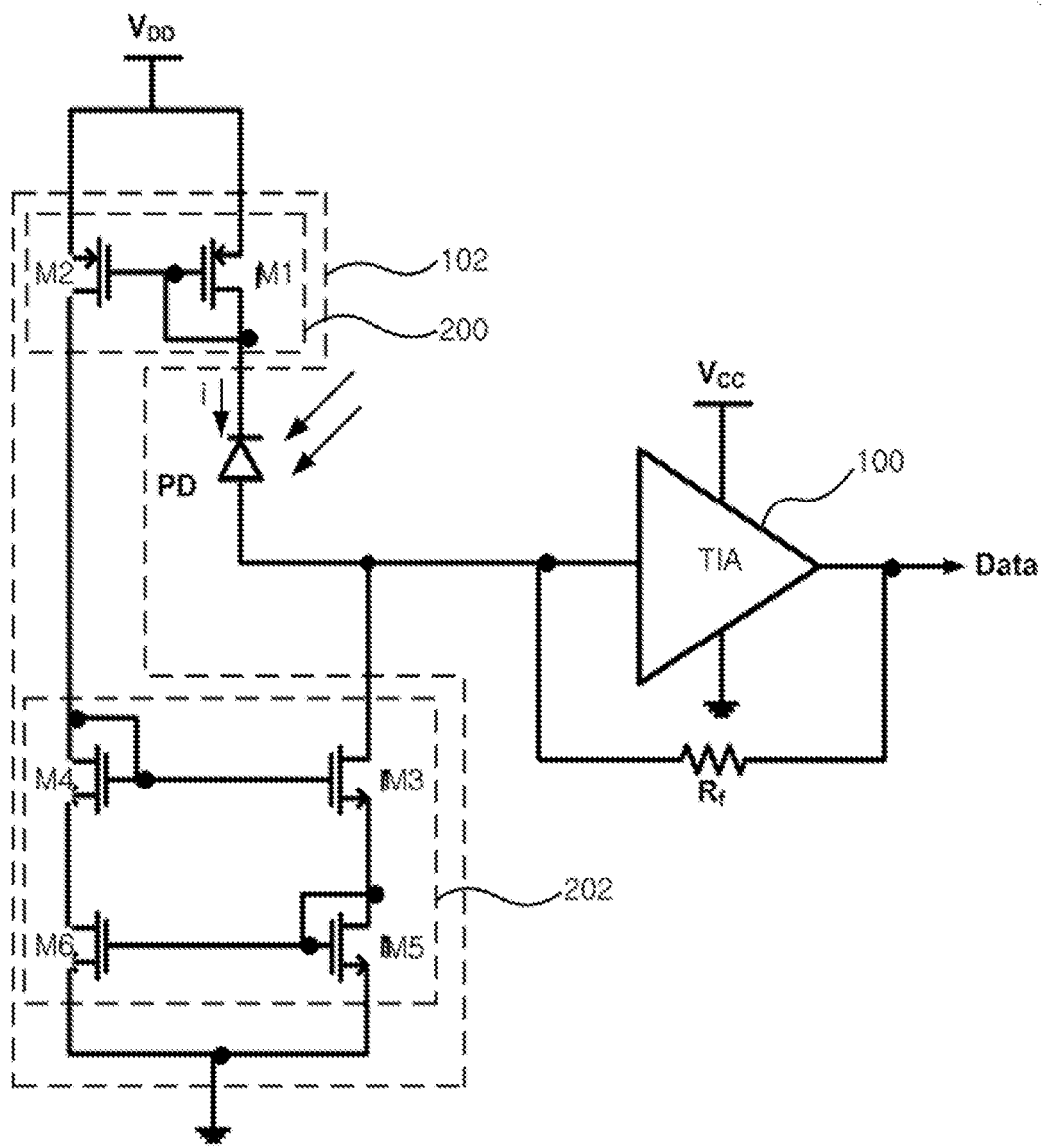
FIG. 2 is a diagram showing a circuit of the optical communication receiver according to a first embodiment of the present invention.

FIG. 2 is a diagram showing a circuit of the optical communication receiver according to a first embodiment of the present invention.

Referring to FIG. 2, the optical communication receiver of this embodiment includes a photodiode PD, a transimpedance amplifier 100 and a DC offset compensation circuit 102.

The DC offset compensation circuit 102 may include a circuit to compensate for an over-current when the photocurrent outputted from the photodiode PD is an over current more than a predetermined set value.

According to one aspect of the invention, the DC offset compensation circuit 102 may include a first mirror circuit 200 consisting of a first transistor M1 and a second transistor M2, and a second mirror circuit 201 consisting of a third transistor M3, a fourth transistor M4, a fifth transistor M5 and a sixth transistor M6. Of course, although not shown, a first resistor, a second resistor, a third resistor and a fourth resistor may be provided between the first transistor M1 and a voltage source $V_{DD}$, between the second transistor M2 and the voltage source $V_{DD}$, between the fifth transistor M5 and the ground, and between the sixth transistor M6 and the ground, respectively.

The voltage source $V_{DD}$ serves to supply a voltage previously set in the DC offset compensation circuit 102, for instance, a voltage of 5V.

The first mirror circuit 200 may include transistors M1, M2 having a mirror structure, and the MOS transistors M1 and M2 may be P-MOS transistors.

The first transistor M1 is connected between the voltage source $V_{DD}$ and the photodiode PD, and operates in response to a voltage supplied from the voltage source $V_{DD}$. In this case, a current (i) flows through the first transistor M1. For example, a gate of the first transistor M1 is connected to a drain and a source may be connected to the first resistor.

The second transistor M2 forms a mirror structure together with the first transistor M1 and the gate may be connected to the gate of the first transistor M1, and the source may be connected to the second resistor.

Since the first mirror circuit 200 has a mirror structure, the current (i) flowing through the first transistor M1 or a current proportional to the current (i) may flow through the second transistor M2. The amount of current flowing through the second transistor M2 may be determined by the size of the transistors M1 and M2.

The second mirror circuit 202 includes transistors M3, M4, M5 and M6 having the Wilson current mirror structure and may compensate the DC offset by discharging to the ground at least a portion of current inputted to the amplifier 100 when the photocurrent outputted from the photodiode (PD) is an over-current. In addition, the second mirror circuit 202 may remove the input load effect, while compensating the DC offset.

If compensating only the DC offset, the second mirror circuit 202 may include only the two transistors M3 and M4. However, if such a second mirror circuit 202 is used, the photocurrent which is input to the amplifier 100 may be disturbed due to the transistor M3. Accordingly, the present invention employs additionally the transistors M5 and M6 in addition to the transistors M3 and M4 in order to remove such an input load effect, that is, the second mirror circuit 202 may be implemented with the Wilson current mirror circuit.

If the transistors M5 and M6 are additionally employed, the impedance of the second mirror circuit 202 increases at the input terminal of the amplifier 100. As a result, the input load effect may be reduced. That is, since the impedance is increased, the photocurrent inputted to the amplifier 100 may not be disturbed by the transistor M3. In addition, as the output impedance increases, the DC current of the photocurrent inputted to the amplifier 100 at the time of the over current may be linearly discharged through the second mirror circuit 202.

According to one aspect of the invention, the MOS transistors M3, M4, M5 and M6 each may be N-MOS transistors.

The drain of the third transistor M3 is connected to the input terminal of the amplifier 100, the gate thereof is connected to the gate of the fourth transistor M4, the source thereof may be connected to the drain of the fifth transistor M5.

The drain of the fourth transistor M4 may be connected to the drain of the second transistor M2, the gate thereof may be connected to the gate of the third transistor 3, and the source thereof may be connected to the drain of the sixth transistor M6. In addition, the gate and the drain of the fourth transistor M4 may be connected to each.

The source of the fifth transistor M5 may be connected to the ground via a third resistor, the drain thereof may be connected to the source of the third transistor M3, the gate thereof may be connected to the gate of the sixth transistor (M6). In addition, the gate and the drain of the fifth transistor M5 may be connected to each other.

The gate of the sixth transistor (M6) may be connected to the gate of the fifth transistor M5, the drain thereof may be connected to the source of the fourth transistor M4, and the source thereof may be connected to the ground via the fourth resistor. As a result, the current flowing through the second transistor M2 may flows into the ground via the fourth transistor M4 and the sixth transistor M6.

Here, the amount of current flowing through the transistors M3 and M4 may vary depending on the size ratio of the third transistor M3 and the fourth transistor M4. The amount of current flowing through the fifth transistor M5 and the sixth transistor M6 may vary depending on the size ratio of the transistors M5 and the sixth transistor M6. For example, if the size of the third transistor M3 is more than the size of the fourth transistor M4, the amount of current flowing through the third transistor M3 is greater than the amount of current flowing through the fourth transistor (M4). If the size of the third transistor M3 is less than the size of the fourth transistor (M4), the amount of current flowing through the third transistor M3 is less than the amount of current flowing through the fourth transistor M4. The size of the NMOS transistor is determined by the width and length of the gate of the NMOS transistor, specifically, which is in proportion to the width of the gate thereof and inversely proportional to the length of the gate thereof. On the other hand, the width and length of the gates of the transistors M3 and M4 included in the second mirror circuit may have the same value, and the width and length of the gates of the transistors M5 and M6 may have the same value.

The third resistor is connected between the source and ground of the fifth transistor M5 to adjust the current flowing through the third transistor M3 and the fifth transistor M5. Here, if the resistance value of the third resistor is large, the current decreases, and if the resistance value of the third resistor is small, the current flowing in the third transistor M3 increases.

The fourth resistor is connected between the source and ground of the sixth transistor M6 to adjust the current flowing through the fourth transistor M4 and the sixth transistor M6.

Hereinafter, the operation of the DC offset compensation circuit 102 will be described.

When a voltage is supplied from the voltage source $V_{DD}$, the first mirror circuit 200 and the second mirror circuit 202 start to operate.

Since the first mirror circuit 200 has the mirror structure, the current (i) that is output from the photodiode PD flows through the second transistor M2.

At this time, the current regulated by the fourth resistor flows through the fourth transistor M4 and the sixth transistor M6. Since the second mirror circuit has the Wilson current mirror structure, the current which is equal or proportional to the amount of the current flowing through the fourth transistor M4 and the sixth transistor M6 flows through the third transistor M3 and the fifth transistor M5.

In such a DC offset compensation circuit 102, if the current output from the photodiode PD is an over-current, the intensity of the current flowing through the fourth transistor M4 increases. Accordingly, the voltage of the node corresponding to the gate of the fourth transistor M4 increases, and as a result, the voltage of the gate of the fourth transistor M4 increases. Thus, the amount of the current flowing into the third transistor M3 increases, and as a result, the voltage of the gate of the fifth transistor M5 is raised. As a result, the transistors M3 and M5 are turned on such that at least a portion of the photocurrent of the direct current inputted to the amplifier 100 is discharged to ground. Therefore, the amount of the current inputted to the amplifier 100 becomes smaller, and accordingly the preamplifier 100 may operate stably even in the case where the over current is created.

In short, in the optical communication receiver according to the embodiment, the DC offset compensation unit 102 may prevent the input current effect as well as it compensate the DC offset.

Although not described above, a feedback resistor Rf may be formed between the input terminal and the output terminal of the amplifier 100. The feedback resistor Rf may improve the gain of the amplifier 100.

Figure 3:
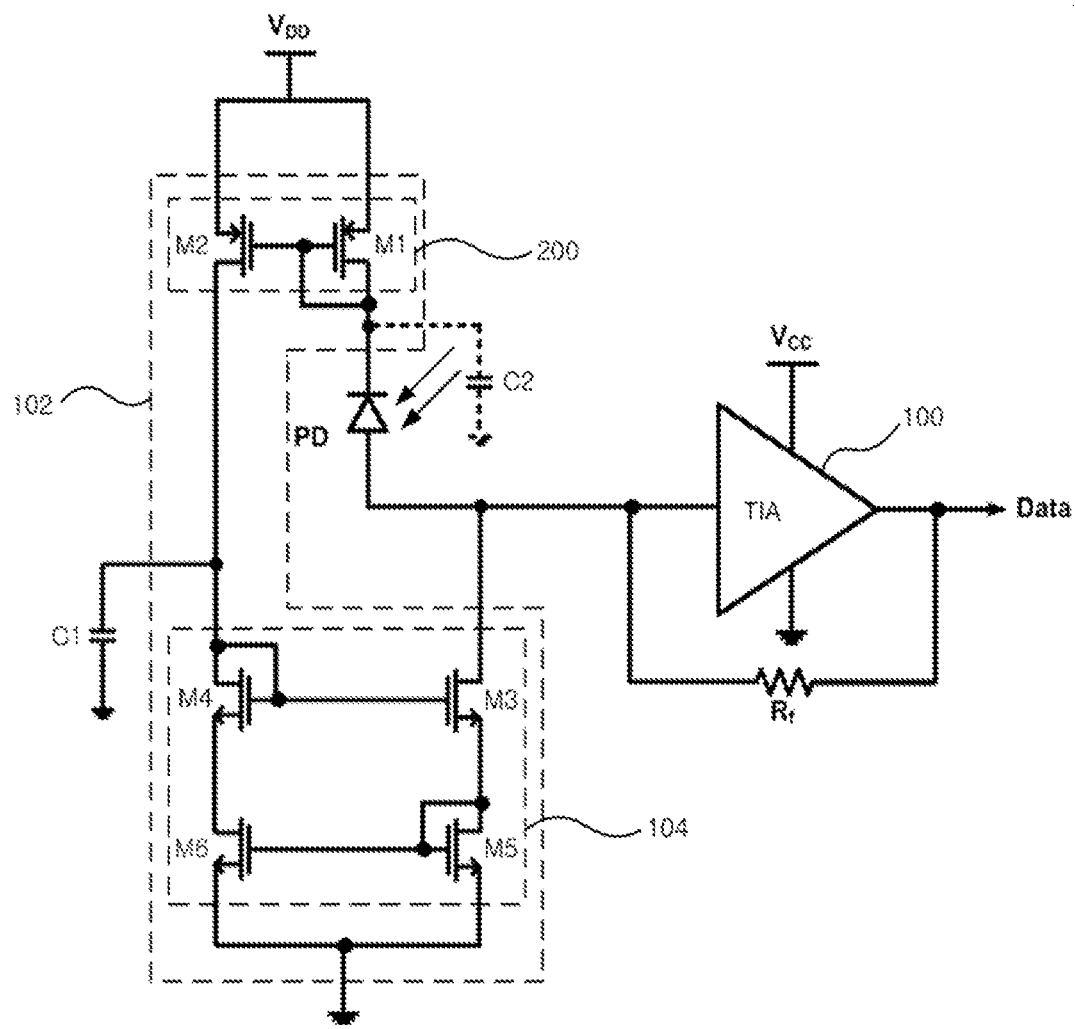
FIG. 3 is a diagram showing a circuit of the optical receiver according to a second embodiment of the present invention.

FIG. 3 is a diagram showing a circuit of the optical communication receiver according to a second embodiment of the present invention.

Referring to FIG. 3, the optical communication receiver according to the second embodiment may include a photodiode PD, a trans-impedance amplifier 100, and a DC offset compensation unit.

The DC offset compensation unit may include additionally a negative feedback prevention circuit such as, for example, a capacitor C to prevent the negative feedback of alternating current, in addition to a first mirror circuit and a second mirror circuit to compensate the DC offset and removing the input load effect.

Since the mirror circuits other than the negative feedback prevention circuit are the same circuits as in the first embodiment, they will not be described below.

If there is no negative feedback prevention circuit, the alternating current out of the photocurrent outputted from the photodiode (PD) is input to the trans-impedance amplifier 100, but, a portion of the alternating current may be negative-fed back through the DC offset compensation circuit. Specifically, a portion of the alternating current may be input to the trans-impedance amplifier 100 through the first transistor M1, the second transistor M2, the fourth transistor M4, the sixth transistor M6, the fifth transistor M5 and the third transistor M3. That is, the normal alternating current and the negative-fed back alternating current may be input to the trans-impedance amplifier 100, and the normal alternating current and the negative-fed back alternating current may have a mutually opposite polarity, so the alternating currents may be offset.

Accordingly, according to the present invention, the negative-fed back alternating current may be eliminated by connecting the capacitor C to the negative feedback current path through the first transistor M1, the second transistor M2, the fourth transistor M4, the sixth transistor M6, the fifth transistor M5 and the third transistor M3.

According to one aspect, the capacitor C1 for removing the negative feedback alternating current may be connected to the node between the second transistor M2 and the fourth transistor M4.

According to another aspect of the present invention, the capacitor C2 for removing the negative feedback alternating current may be connected to the node between the first transistor M1 and the photodiode PD.

However, the size of the capacitor C1 may be smaller than the size of the capacitor C.

Figure 4:
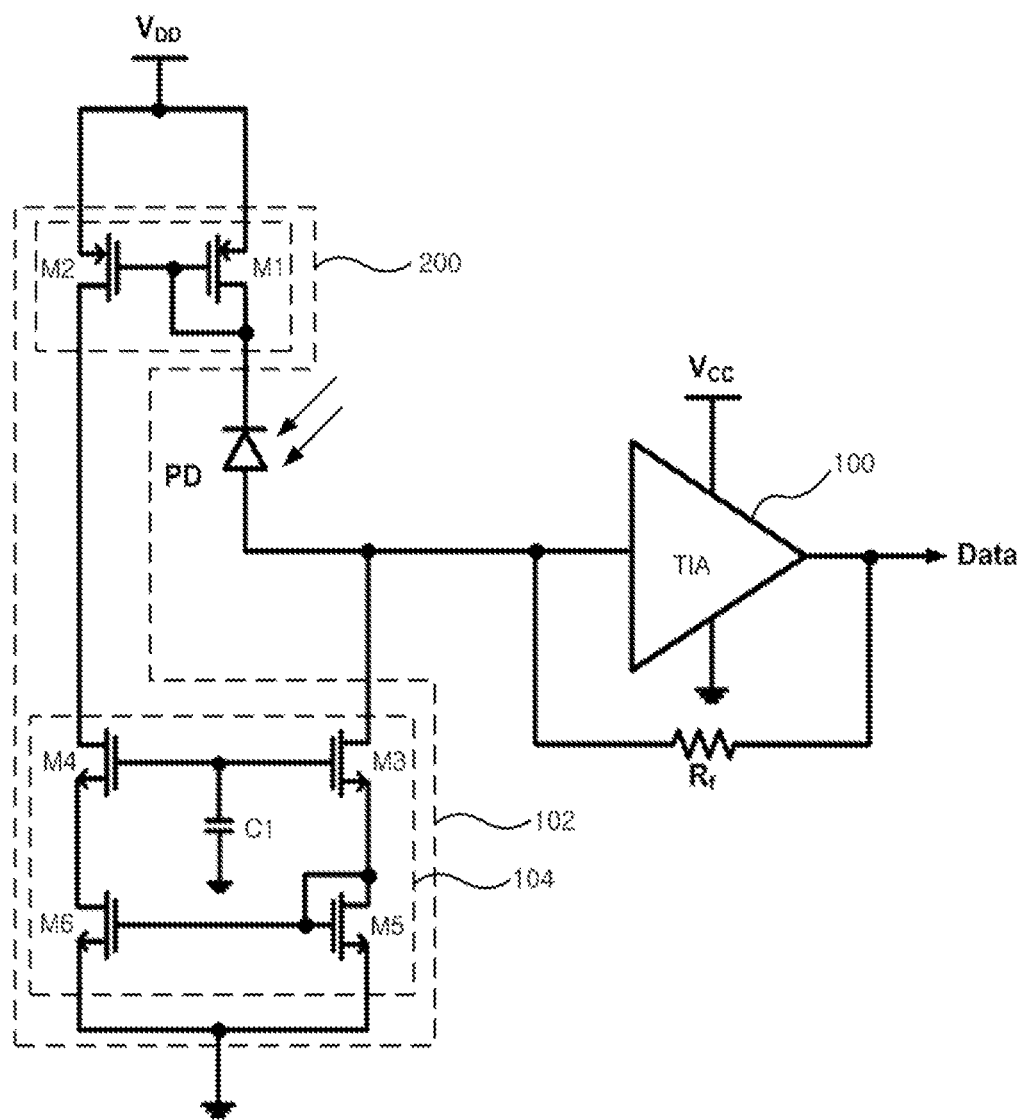
FIG. 4 is a diagram showing a circuit of the optical receiver according to a third embodiment of the present invention.

FIG. 4 is a diagram showing a circuit of the optical communication receiver according to the third embodiment of the present invention.

Referring to FIG. 4, the optical communication receiver according to the embodiment may include a photodiode PD, a trans-impedance amplifier 100, and a DC offset compensation unit.

The transistors M3 and M4 in the DC offset compensation unit do not have a mirror structure, unlike in other embodiments. For example, the gate and drain of the fourth transistor M4 are not connected to each, and the capacitor C3 for eliminating the negative feedback alternating current may be connected between the transistors M3 and M4. In this case, since the resistance of the gate of the fourth transistor M4 is virtually unlimited, the size of the capacitor C3 in the current embodiment can be considerably smaller than that in the second embodiment. For example, the size of the capacitor may be small when a low-pass band filter is implemented in order to remove a negative feedback alternating current. That is, since the gate resistance of the fourth transistor M4 is significantly large, the size of the capacitor C3 can become significantly reduced.

Figure 5:
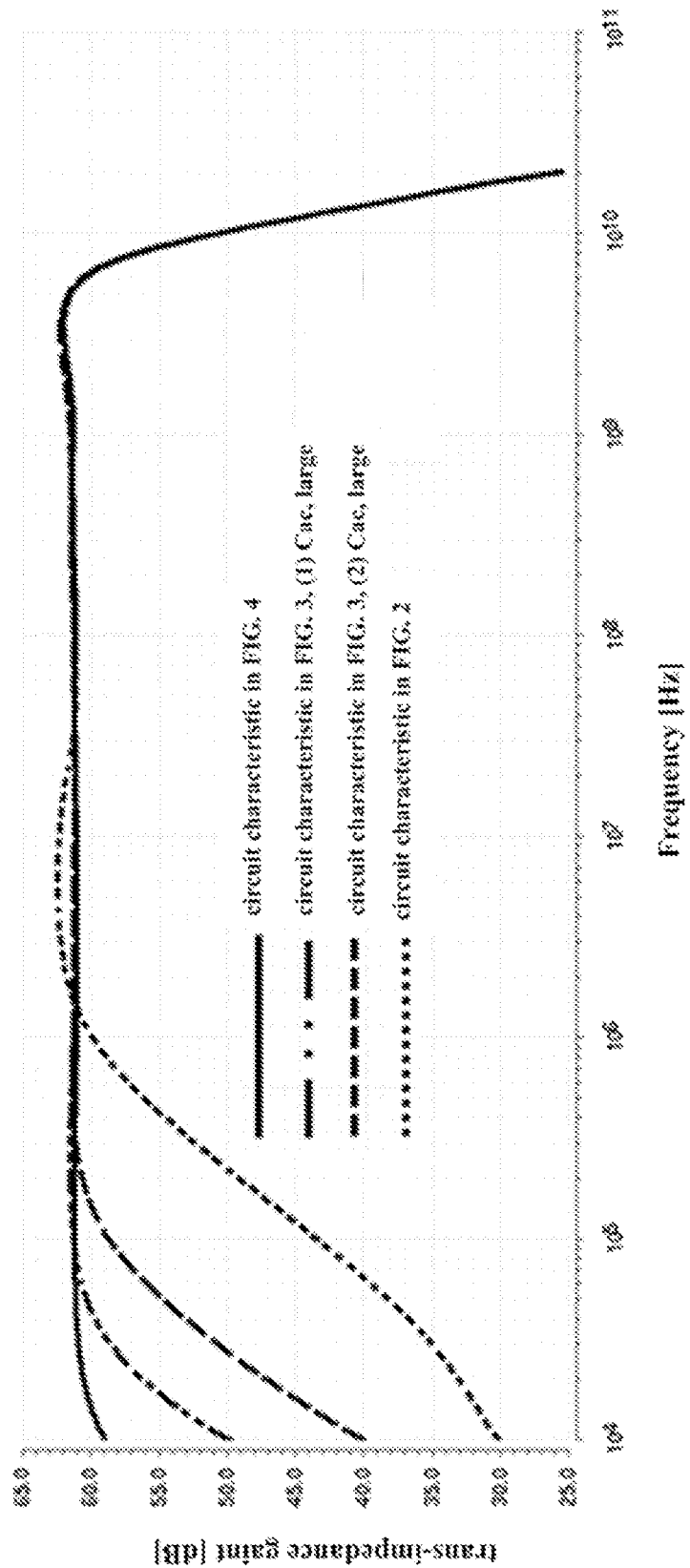
FIG. 5 is a graph showing the results of trans-impedance gains of the optical communication receivers of the present invention.

FIG. 5 is a graph showing the trans-impedance gains of the optical communication receivers according to the present invention.

Referring to FIG. 5, it can be seen that the trans-impedance gain of the optical communication receiver according to the third embodiment is superior to the trans-impedance gain of the optical communication receiver according to the first embodiment and the second embodiment. That is, even though the size of the capacitor C3 in the third embodiment is quite smaller than the size of the capacitor C1 or C2 in the second embodiment, the resistance of the gate of the transistor is almost close to infinity, thus, the performance of the optical communication receiver according to the third embodiment can be more excellent.

Figure 6:
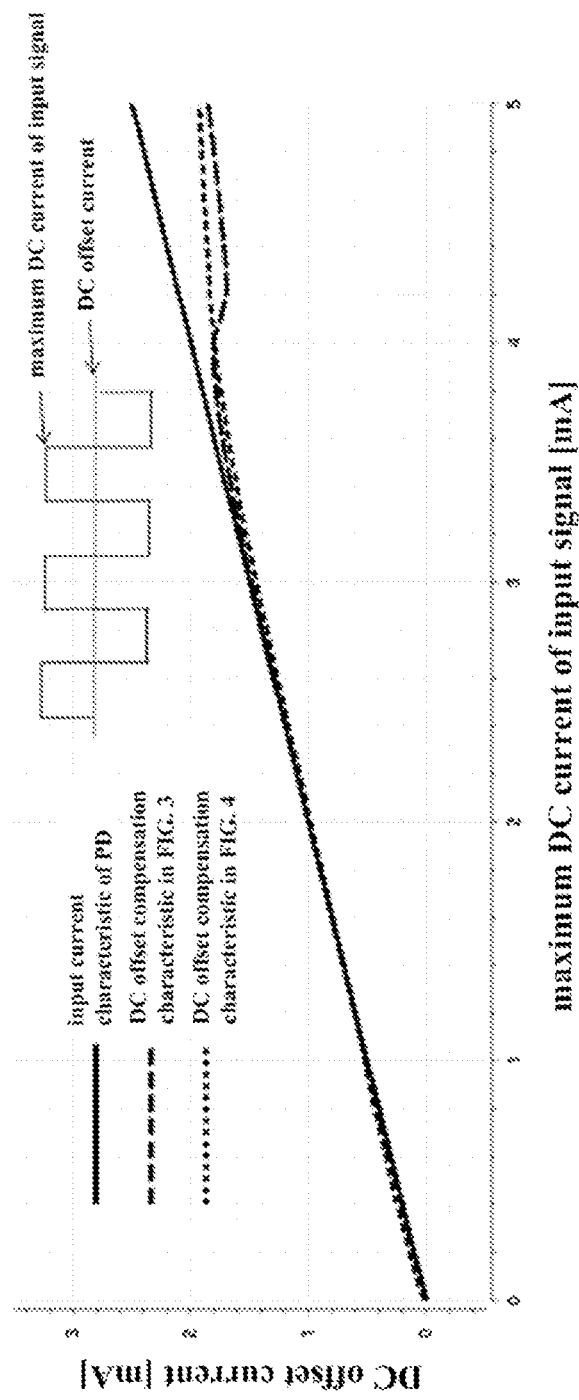
FIG. 6 is a graph showing DC offset current characteristics of the optical communication receivers of the present invention.

FIG. 6 is a graph showing the DC offset current characteristic of the optical communication receiver according to the present invention.

As shown in FIG. 6, in the optical communication receivers according to the second embodiment and the third embodiment, it can be seen that the DC offset compensation is implemented at the time of the over-current. In addition, it can be seen that the DC offset compensation characteristic of the optical communication receiver according to the second embodiment is similar to the DC offset compensation characteristic of the optical communication receiver according to the third embodiment.

According to the present invention, the optical communication receiver can compensate the DC offset while preventing the input load effect.

In addition, the optical communication receiver can remove the negative feedback of alternating current of the photocurrent outputted from the photodiode.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An optical communication receiver, comprising:
an optical signal detector;
an amplifier inputted with a photocurrent outputted from the optical signal detector; and
a DC offset compensation unit provided therein with a third transistor and a fifth transistor which are connected in series to each other to prevent an input load effect, wherein the DC offset compensation unit compensates a DC offset by outputting at least a portion of DC current inputted to the amplifier to ground through the third transistor and the fifth transistor when the photocurrent is an over current more than a predetermined set value.

2. The optical communication receiver of claim 1, wherein the photo signal detector is a photodiode and the amplifier is a trans-impedance amplifier; the DC offset compensation circuit includes a first mirror circuit connected between the photodiode and a voltage source and a second mirror circuit connected between the photodiode and the ground; and the third transistor and the fifth transistor are included in the second mirror circuit.

3. The optical communication receiver of claim 2, wherein the first mirror circuit includes a first transistor connected to the photodiode and a second transistor forming a mirror structure with the first transistor; and the second mirror circuit includes the third transistor, a fourth transistor forming a mirror structure together with the third transistor, the fifth transistor, and a sixth transistor forming a mirror structure together with the fifth transistor, wherein a gate and a drain of the fourth transistor are connected to each, and a gate and a drain of the fifth transistor are connected to each.

4. The optical communication receiver of claim 3, wherein a negative feedback prevention circuit is formed in a negative feedback path through the photodiode, the first transistor, the second transistor, the fourth transistor, a sixth transistor, the fifth transistor and the third transistor to remove a negative feedback alternating current out of the photocurrent.

5. The optical communication receiver of claim 4, wherein the negative feedback prevention circuit is a capacitor and the capacitor is connected to a node between the second transistor and the fourth transistor.

6. The optical communication receiver of claim 4, wherein the negative feedback prevention circuit is a capacitor and the capacitor is connected to a node between the first transistor and the photodiode.

7. The optical communication receiver of claim 2, wherein the first mirror circuit includes a first transistor connected to the photodiode and a second transistor forming a mirror structure with the first transistor; and the second mirror circuit includes the third transistor, a fourth transistor connected at its gate to a gate of the third transistor, and a sixth transistor forming a mirror structure together with the third transistor, the fifth transistor, the fifth transistor and a sixth transistor forming a mirror structure together with the fifth transistor, wherein a capacitor as a negative feedback prevention circuit for removing a negative feedback alternating current out of the photocurrent is connected to a node between a gate of the third transistor and a gate of the fourth transistor, and a gate and a drain of the fifth transistor are connected to each.

8. An optical communication receiver, comprising:
an optical signal detector;
an amplifier inputted with a photocurrent outputted from the optical signal detector; and a DC offset compensation unit compensating a DC offset by discharging at least a portion of a DC current inputted into the amplifier when the photocurrent is an over current more than a predetermined set value, wherein a negative feedback prevention circuit is provided in a negative feedback current path through the optical signal detector and the DC offset compensation unit, and the negative feedback prevention circuit prevents an alternating current out of the photocurrent outputted from the optical signal detector from being negatively fed back through the negative feedback current path.

9. The optical communication receiver of claim 8, wherein the optical signal detector is a photodiode; the amplifier is a trans-impedance preamplifier; the DC offset compensation unit includes a first transistor connected to the photodiode and a voltage source, a second transistor forming a mirror structure together with the first transistor, a third transistor and a fifth transistor that are connected in series between the photodiode and the ground, and a fourth transistor and a sixth transistor that are connected in series between the second transistor and the ground, wherein the fifth and sixth transistors are arranged to form a mirror structure.

10. The optical communication receiver of claim 9, wherein the negative feedback prevention circuit is a capacitor and is connected to a node between the second transistor and the fourth transistor, and the third transistor and the fourth transistor are arranged to form a mirror structure.

11. The optical communication receiver of claim 9, wherein the negative feedback prevention circuit is a capacitor and is connected to a node between the first transistor and the photodiode, and the third transistor and the fourth transistor are arranged to form a mirror structure.

12. The optical communication receiver of claim 9, wherein the negative feedback prevention circuit is connected to a node between a gate of the third transistor and a gate of the fourth transistor.

* * * * *